Jan. 21, 1936.  A. VINCENZONI  2,028,577
SPEED TRANSMISSION MECHANISM
Filed March 28, 1934   6 Sheets-Sheet 2

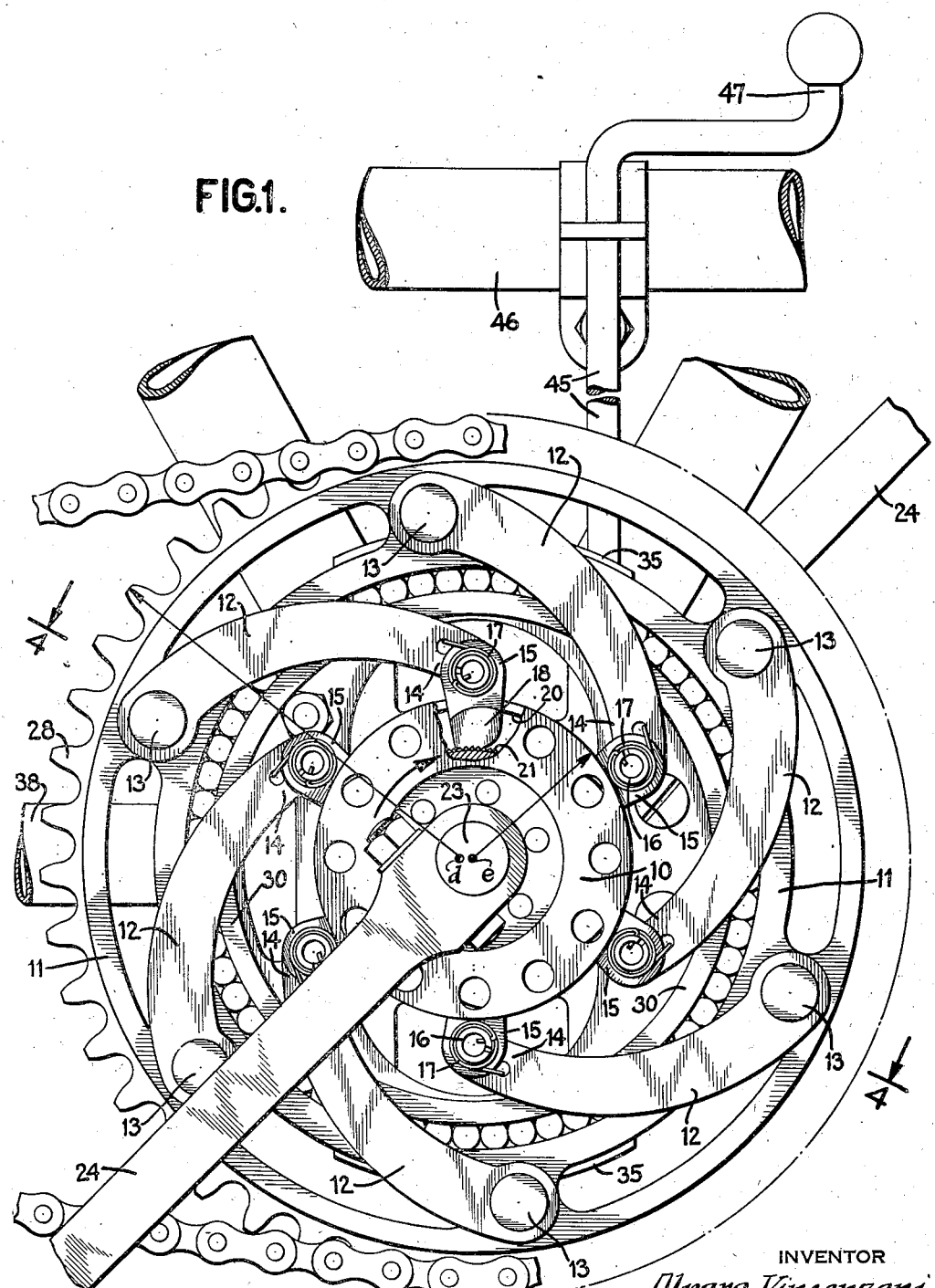

INVENTOR
*Alvaro Vincenzoni*
BY
*Cooper, Kerr & Dunham*
ATTORNEYS

Jan. 21, 1936.  A. VINCENZONI  2,028,577
SPEED TRANSMISSION MECHANISM
Filed March 28, 1934   6 Sheets-Sheet 3
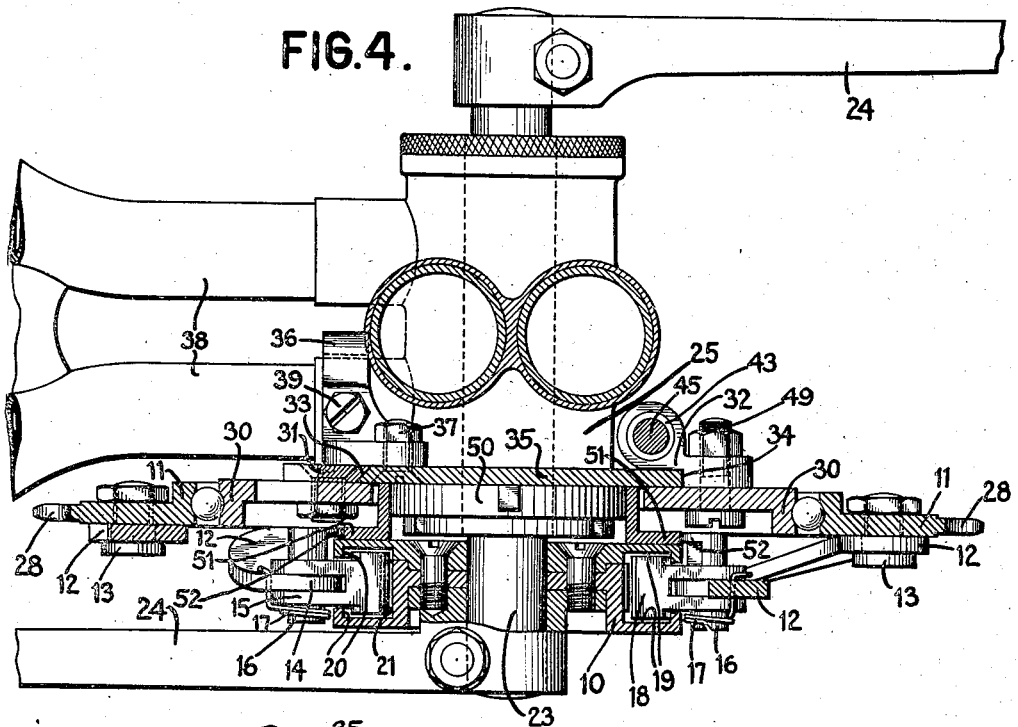
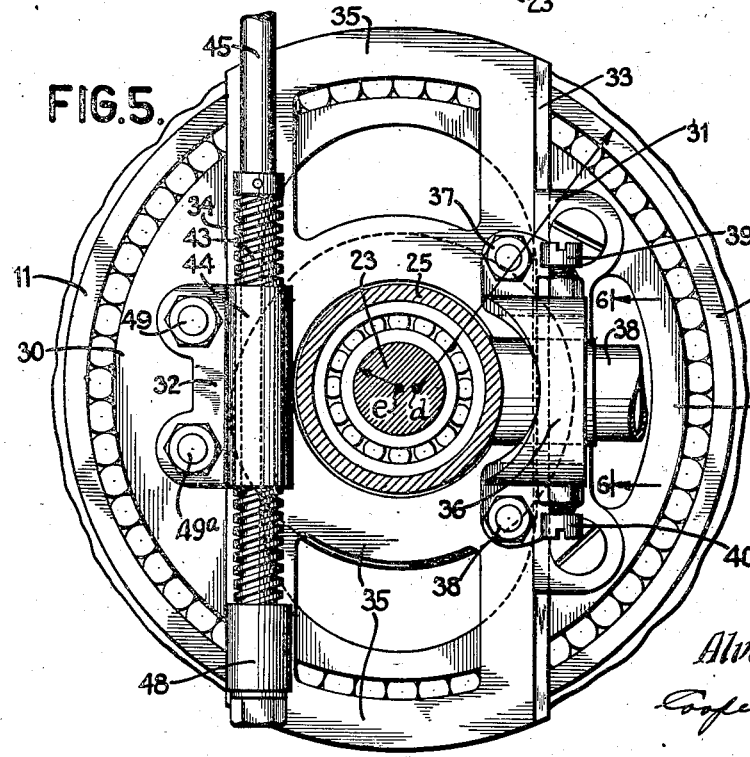
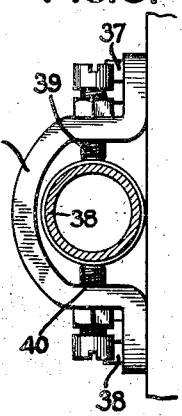
INVENTOR
*Alvaro Vincenzoni*
BY
ATTORNEYS

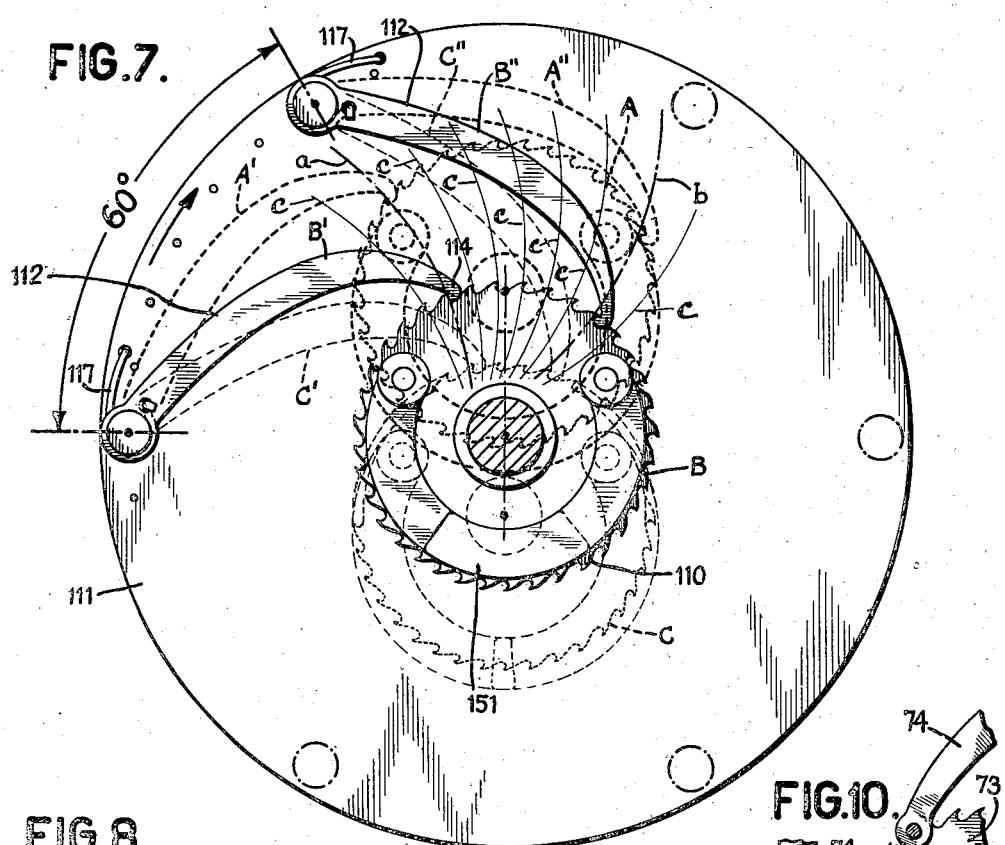
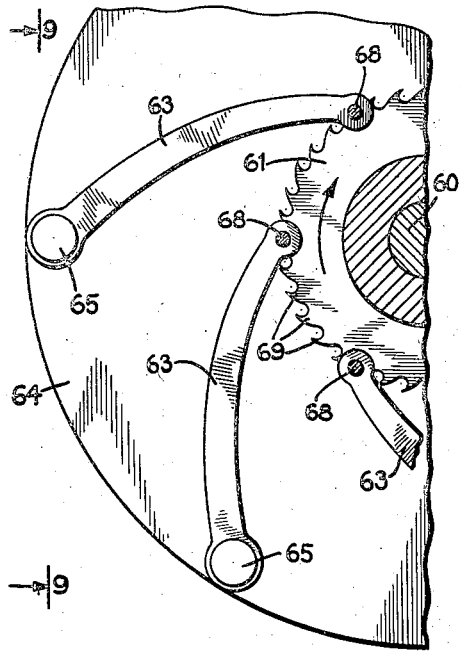
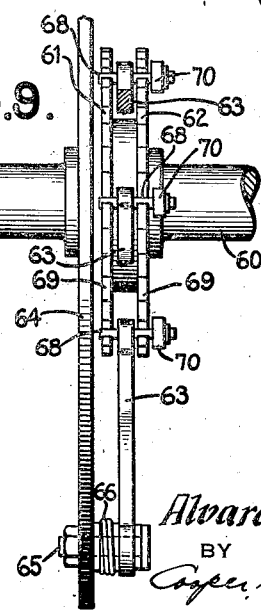
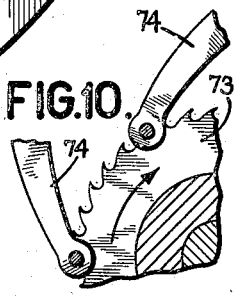

Jan. 21, 1936.  A. VINCENZONI  2,028,577
SPEED TRANSMISSION MECHANISM
Filed March 28, 1934   6 Sheets-Sheet 5

INVENTOR
*Alvaro Vincenzoni*
BY
ATTORNEYS

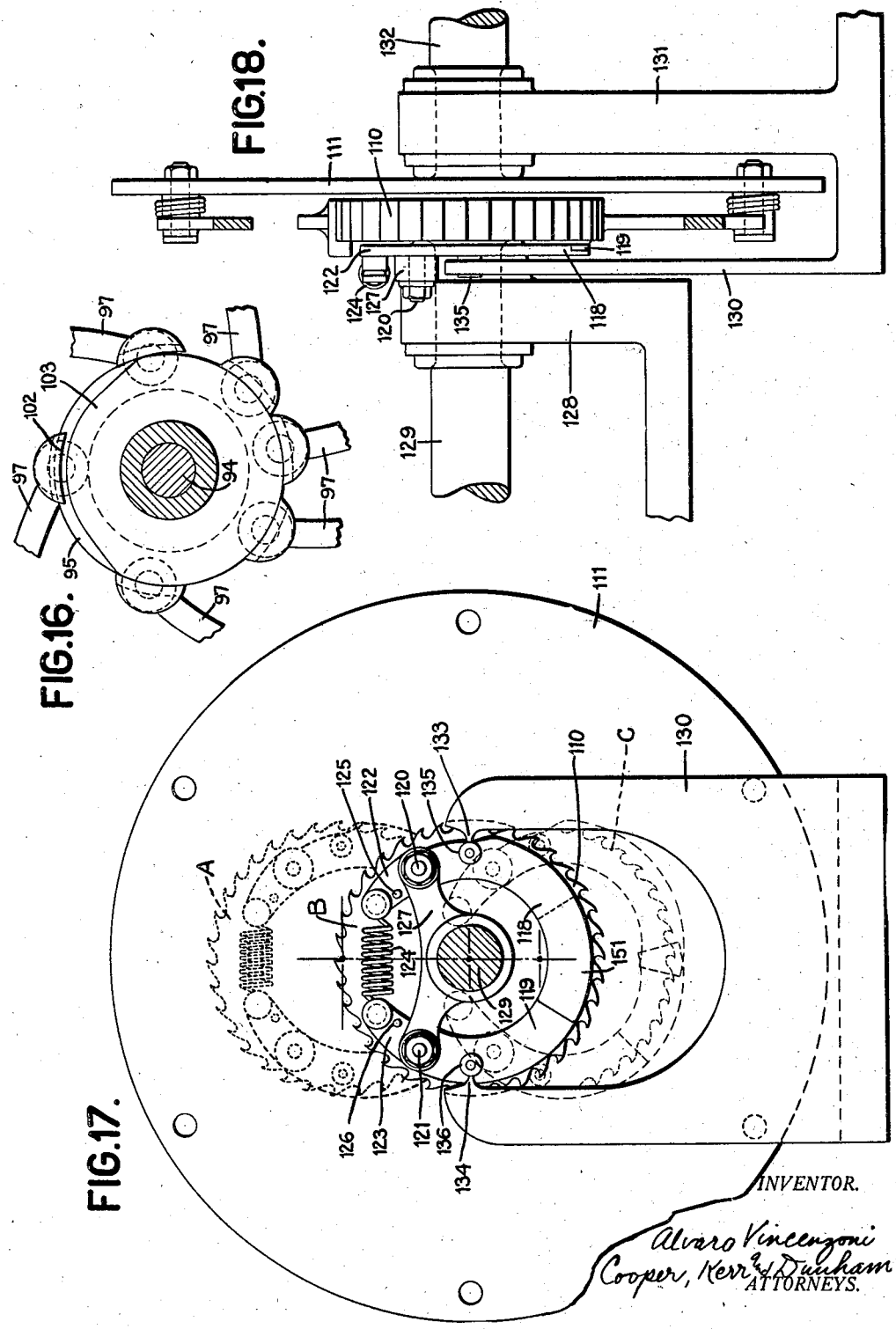

Patented Jan. 21, 1936

2,028,577

UNITED STATES PATENT OFFICE 2,028,577

SPEED TRANSMISSION MECHANISM

Alvaro Vincenzoni, Rome, Italy

Application March 28, 1934, Serial No. 717,691
In Italy June 3, 1933

4 Claims. (Cl. 74—112)

This invention relates to speed transmission mechanism. Among the objects of the invention is to provide a mechanism which may be adjusted during its operation to vary the ratio of angular velocities between rotary driving and driven members.

Another object of the invention is to provide a variable speed transmission mechanism which is continuously operative as a power transmitting connection between a driving member and a driven member so that there is always provided a direct connection between the two members by which it is possible to vary the ratio of speed transmission and which automatically permits the overrunning of the driving member by the driven member.

Other objects involving novel constructions and combinations of parts will appear in the appended claims and in the specification which sets forth a preferred embodiment of the invention.

The invention may be fully understood from the detailed description and drawings, in which Fig. 1 is a side elevation of a variable speed transmission attached to a bicycle and embodying the principle of the invention.

Fig. 4 is a sectional view taken on line 4—4 of Fig. 1.

Fig. 5 is a view taken from the rear of Fig. 1 with parts broken away.

Fig. 6 is a detail on line 6—6 of Fig. 5.

Fig. 7 is a schematic showing of a modified form of the variable speed mechanism as used herein for explaining the principle of the invention.

Fig. 8 illustrates principal parts of a modification of the variable speed transmission mechanism.

Fig. 9 is a section on line 9—9 of Fig. 8.

Fig. 10 is a detail illustrating another mode of applying the invention.

Fig. 16 is a front elevation on line 16—16 of Fig. 14.

Fig. 17 is a front elevation of the modification illustrated in Fig. 7, showing details of the variable cam.

Fig. 18 is a side view of the variable cam illustrated in Fig. 17.

Figure 3:
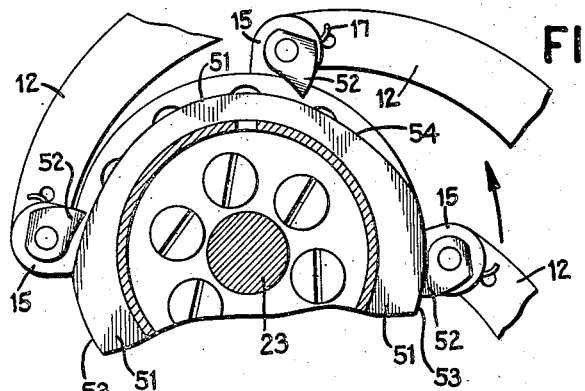
Fig. 3 is a detail of a cam as seen from the rear of Fig. 2.

While the principle of the invention may be utilized in different forms and for different uses, of which I have illustrated several by way of example, I have chosen to describe the same as constructed for use upon a bicycle because of its general adaptability to such use. The invention provides for obtaining various ratios of speed transmission without dependence upon such speed transmission mechanism as requires disconnection between the driving and driven members.

In its simplest form the invention consists of a pair of rotatable shafts, one carrying a driving member and one carrying a driven member, which may be shifted in respect to each other from a position of eccentricity through a position of concentricity to an opposite position of eccentricity, and connecting means for transmitting motion from the driving member to the driven member. The connecting means include arms pivoted upon one of the members in such a manner that they may be engaged by the other member for a portion of the angular travel of the second member, the arms being so mounted as to continually rock in respect to both members whenever the members are in eccentric positions relative to each other. The relation of the arms to each other is such that they successively come into operation to transmit motion from one member to the other member, whereby there is always a direct connection between the two members, and this is so irrespective of any change in eccentricity of the two members while motion is being transmitted through the mechanism. Changes in eccentricity produce changes in ratio of speed transmission without discontinuance of a direct driving connection.

It will be apparent from the description which follows that with suitable changes the functions of the driving and driven members may be reversed in respect to each other, and that the invention is susceptible to other variations owing to the fact that the lineal displacement of the driving and driven members and their respective shafts is relative in character.

The variable speed transmission mechanism illustrated in Fig. 1 includes a driving member 10, a driven member 11 and six connecting elements 12. The connecting elements are in the form of arms pivotally mounted on pivots 13 equi-spaced from one another upon the driven member 11. The ends 14 of the arms 12 are provided with rockers 15 carried by pins 16. The ends 14 may be considered as the free or floating ends of the arms 12 because they move in respect to the driving member 10 when they are not connected to the driving member for driving the driven member.

Each rocker 15 is urged to rotate about its associated pin 16 in a counter-clockwise direction (Fig. 1), by a spring 17. Each rocker 15 carries at its extremity a dog 18 which is so proportioned as to fit within a channel in the driving member which consists of two grooves 19 (Fig. 4) facing one another. The dog protrudes laterally so as to enable simultaneous engagement with the two grooves 19 and each protrusion is so shaped as to cause engagement with opposite surfaces 20, 21 of each groove 19 when its rocker is rocked about its pivot in a counter-clockwise direction. The position of engagement of a dog 18 with the opposite surfaces 20, 21, is illustrated in Fig. 1 and by the uppermost dog in Fig. 2, and different positions of the rockers, with the dogs out of engagement with the opposite surfaces 20, 21, are illustrated by the lowermost rockers shown in Fig. 2. In the latter positions the dogs have been rotated clockwise about their pivots 16 against the action of springs 17 and this is possible because the relative speeds of the driving member and driven member are such, at the particular positions, that the rockers and connecting arms are overrunning or moving at a greater velocity than the adjacent portions of the driving member. This action takes place during the periods of non-locking engagement of the dogs when the driving member and driven member are in eccentric positions. Further explanation of the action of the connecting arms and engaging dogs will be given hereinafter in conjunction with the schematic showing of a similarly acting construction (Fig. 7).

Having reference to Fig. 1, 23 is the usual driving shaft which is employed on a bicycle and to which the pedal arms 24 are connected. This shaft is journalled in a hub 25, Fig. 4, and has connected thereto the driving member 10. The driving member generally designated as 10 may be made up as shown in Fig. 4 to include a pair of disks rigidly connected together and each carrying a circular groove 19.

Figure 2:
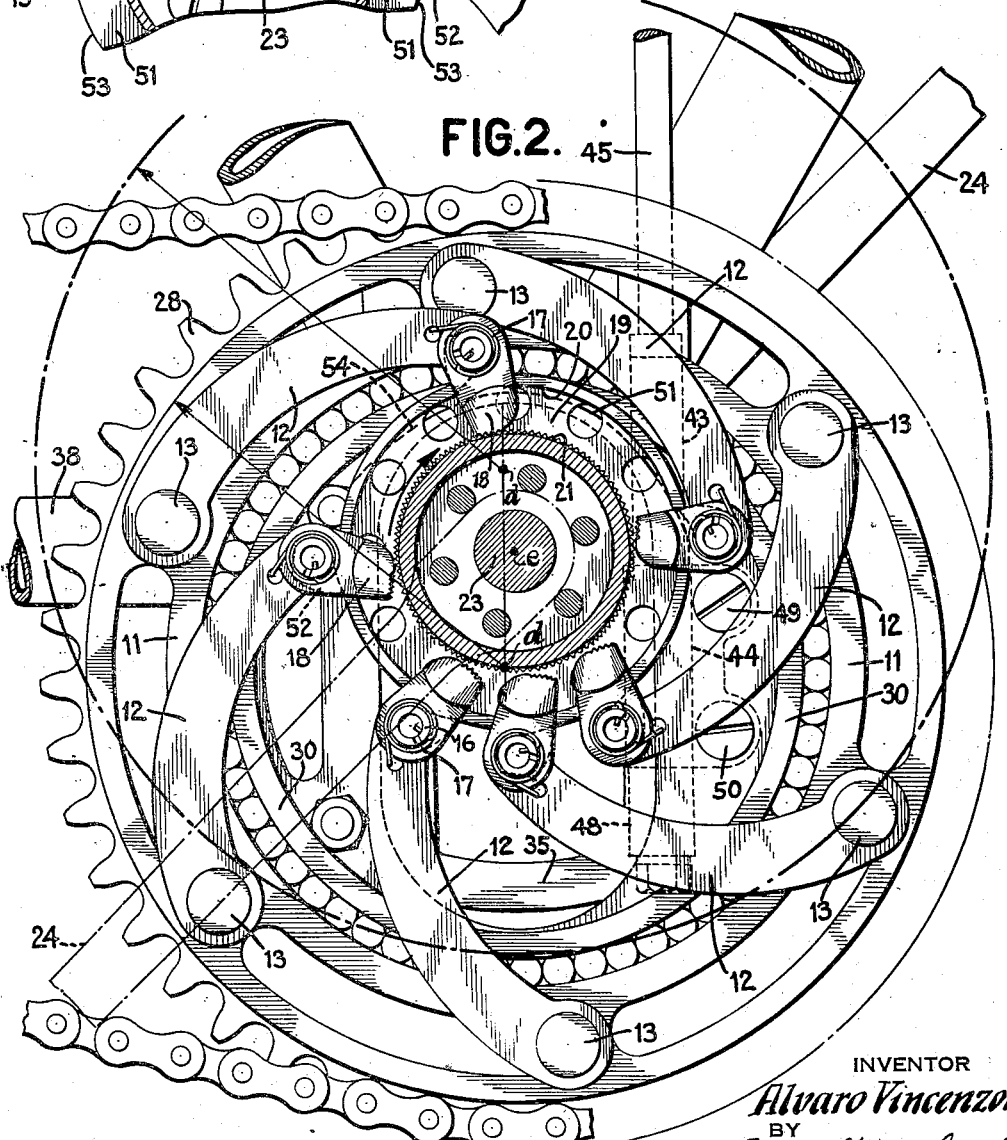
Fig. 2 is a side elevation of the mechanism illustrated in Fig. 1, with the driving and driven members displaced from each other and in such position as to correspond to a gearing reduction.

As shown in Fig. 2 (and in Fig. 11), the dogs which engage in locking relation with the opposite and concentric surfaces 20 and 21 of each groove 19 during periods of power transmission between the driving and driven members are of an oval or elliptical shape and so proportioned as to allow free and non-locking relation with surfaces 20 and 21 when the dogs are rocked in one direction, and locked or engaging relation with surfaces 20 and 21 when the dogs are rocked in the opposite direction. As illustrated in Fig. 2, surface 21 is slightly fluted to increase the frictional contact with the dog but such marking is optional because the dog is so shaped as to jam between the opposite surfaces 20 and 21 when permitted to do so.

The driven member 11 which is in the nature of a sprocket 28 is rotatably supported upon a bearing member 30 which is mounted for displacement in respect to shaft 23 and the driving member 10 carried thereby. To the rear of the bearing member are affixed cleats 31 and 32, Figs. 4 and 5, which have guides for engaging the edges 33 and 34, respectively, of a plate 35. Plate 35 is held in a fixed position by means of a bracket 36 which is affixed thereto by means of bolts 37 and 38. Bracket 36 is, in turn, fastened to the frame 38 of the bicycle by means of screws 39 and 40, Figs. 4, 5 and 6. It is apparent from this construction that the cleats 31 and 32 are adapted to guide the lineal movement of the driven member and sprocket in a vertical direction (Figs. 1, 2 and 5).

In order to displace the driven member 11, and its bearing relative to the driving member and its shaft 23, a worm 43 and engaging nut 44 are provided. The worm is mounted upon a shaft 45 which extends upwardly to the upper cross-bar 46 of the bicycle and is there provided with a crank 47 by which it may be readily rotated. The lower end of the worm shaft is engaged by thrust bearing 48 which is carried by plate 35 and prevents translation of the shaft relative to the plate. Nut 44 is secured to bearing member 30 by means of a pair of bolts 49, 49a, so that the bearing is translated with the nut 44 when the shaft is rotated. The design of the worm and nut are such that the axis of the driven member may be displaced upon either side of the axis of the driving member. The two axes are shown to the same level, except a slight horizontal displacement of the axis of the driven member d relative to the axis of the driving member e, in the positions of the driving and driven members illustrated in Fig. 1, and in the positions of the driving and driven members illustrated in Fig. 2, the axis of the driven member is below that of the driving member. The reason of the slight displacement of the axis of the driven member relative to the axis of the driving member will be explained hereinafter.

To the rear of the driving member 10 there is mounted upon a fixed boss 50, a cam 51 which is best shown in Fig. 3. This cam is provided for determining extremities of an arc between which the dogs 18 may assume driving engagement with grooves 19. For effecting control of the dogs 18, each rocker 15 carries a finger 52 which rides upon the high surface 53 of the cam 51 during the greater portion of the time that the dogs are disengaged from contact with the opposite surfaces of grooves 19. In the construction illustrated in Figs. 1 to 6, inclusive, the cut-away portion 54 of the cam will subtend an arc sufficiently great to permit freedom of the dog and action of its associated spring for the length of the arc of revolution of the driving member determined by the maximum of the eccentric displacement of the driven member relative to the driving member. The length of the engaging arc is dependent upon the number of connecting elements provided in any particular mechanism.

The driving connection between the driving member and driven member is obtained through the successive action of the connecting elements 12. This is because in positions of eccentricity of the driving and driven member any particular point upon the driven member will move at a velocity different from the velocity of any point on the driving member, unless the two particular points are connected together. Accordingly, but one connecting element 12 and associated dog can function at one time for transmitting motion. A locked dog causes transmittal of motion to the driven member through its associated connecting element and, because of the eccentricity of the driving and driven members the dog immediately preceding the locked dog is driven through its connecting arm at a greater velocity than that of the locked dog. When a dog first comes into locking engagement with the grooves, the immediately preceding dog is automatically released from locking engagement. Accordingly, the arc of locking engagement of any dog 18 with the groove 19 is determined by the number of connecting elements and dogs.

It is believed that the operation of the device and principle of the invention may best be understood by reference to a schematic showing of the positions of connecting elements for different ratios of speed transmission between the driving and driven members. Three different ratios of speed transmission are obtained by three different positions A, B and C of the driving member 110 in respect to the driven member 111. Having reference to Fig. 7, A', B' and C' represent three different positions of a connecting element for the three different positions A, B and C, of the driving member 110 relative to the driven member 111, and A", B" and C" represent three different positions of the connecting element for the three different positions A, B and C, respectively, of the driving member 110 in respect to the driven member after the driven member has been moved through an angle of 60°, or through the arcuate distance between two successive connecting elements.

Assuming that the driven member 111 is to be driven through an arc of 60°, the change in ratio of the driving to the driven members for the different positions of the two members relative to each other, may be understood by considering the arcs $a$, and $b$, which define the limits of the arcs of engagement of the free ends 114 of the connecting elements 112 with the driving member 110 for a 60° rotation of the driven member 111. In position A of the driving member, the connecting element will be moved from the position A' to the position A" and its free end 114 will travel a distance between arc $a$ and arc $b$ equal to twelve teeth upon the periphery of the driving member. In position B of the driving member, the peripheries of the driving member and of the driven member are concentric, and the same connecting element will be moved from position B' to position B" and its free end will travel a distance between arcs $a$ and $b$ equal to six teeth on the driving member. With the driving member in position C, the same connecting element will be moved from position C' to position C", and its free end will travel a distance between arcs $a$ and $b$ equal to three teeth upon the periphery of the driving member.

It is apparent that when the axes of rotation of the driving and driven members are alined and the members are concentric to each other (position B), there is a direct drive and a 1 to 1 ratio of the speeds of the two members. This may be expressed as a 6 to 6 ratio and accordingly, the ratio of teeth of the driving member to the driven member for the A-position is 12/6 and the ratio of teeth of driving member to the driven member for the C position is 3/6. The speed ratios are the inverse of the teeth ratios so that there will be a reduction in speed transmission for the A position, and increase in speed transmission for the C position, whereas a 1:1 ratio will be obtained for the B position. It is apparent from the foregoing that other positions intermediate the A and C positions are possible, and that with 36 teeth on the driving member, the following different ratios of speed of driving member to driven member are obtainable: 6/12, 6/10, 6/9, 6/8, 6/7, 6/6, 6/5, 6/4, 6/3. The number of speed ratios is variable to any degree of limits between the two positions of extreme eccentricity which are permissible in a particular design of any mechanism.

The similar arcs $c$, which are marked by a slighter line in the space interposed and immediately exterior to arcs $a$ and $b$ indicate some intermediate positions of the connecting elements on the periphery of the driving member, a corresponding to an equal number of angular and uniform displacements of the driven member.

It is evident that, the angular velocity of the driving member being kept uniform, when one of the connecting elements reaches the arc $a$, consequently engaging with the driving member, the velocity of the free end of the connecting element which immediately precedes, and which will have reached the arc $b$ will be gradually increased relative to the peripheric velocity of the adjacent surface of the driving member. Such increasing velocity will cause the connecting element immediately preceding the one which is locked to the driving member to run forward over the teeth of the driving member, and consequently to automatically disconnect itself from engagement therewith, so that the said connecting element will be permitted to freely reach the high surface of the cam and run over it, as hereinafter described.

In order to maintain the ineffective or non-engaging connecting elements out of contact with the driving member, a cam 151 similar to cam 51 illustrated in Figs. 1 to 5, inclusive, is provided. This cam should have a cut-away portion somewhat in excess of the greatest distance between arcs $a$ and $b$, in a clockwise direction, Fig. 7, which is at the periphery of driving member 110 in position A. The high surface of the cam should extend approximately from the arm $b$ to the arc $a$ in a clockwise direction, Fig. 7, but the cam should be variable in design, as shown in position B, because while it is necessary to keep the ineffective or non-engaging connecting elements out of contact with the driving member for all eccentric positions of the driving member, nevertheless when the driving member is in a concentric position with the driven member all the connecting elements must remain in connection with the driving member, in which case the angular velocity of the two members is the same. Furthermore, the cam 151 could be variable in design also because it could be desirable to keep all the connecting elements out of contact with the driving member when the ends 114 of the connecting elements are traveling faster than adjacent portions of the driven member.

Cam 151 includes two parts 118 and 119 which are pivotally supported upon pins 120 and 121, respectively. When the axes of the driving and driven members are concentric, the parts 118 and 119 of the cam are disposed entirely within the toothed periphery of the driving member 110, Figs. 7, 17 and 18, and when the a. is of the driving member is eccentric to the axis of the driven member upon either side of the concentric positions of these members, the two cam parts are separated sufficiently so as to extend beyond the periphery of the teeth upon the driving member.

The manner in which the cam is made variable for the different positions is illustrated in Figs. 17 and 18. Part 118 is provided with an arm extension 122 which extends beyond pin 120, and part 119 likewise is provided with an arm extension 123 extending beyond pivot 121. The outer ends of these arms are connected by a spring 124 which normally tends to draw arms 122 and 123 toward each other to cause separation of parts 118 and 119 of the cam. The separated position of the parts 118 and 119, and hence the expanded condition of the cam, is determined by a pair of pins 125 and 126 which engage the arms of a yoke 127 when spring 124 is free to act as, for example, when the cam is upon either side of the position for one-to-one ratio transmission, Figs. 7 and 17. Yoke 127 is carried by fixed bearing member 128 which supports shaft 129, and driving member 110, Fig. 18. The cam-supporting yoke 127 is always in the same axial relation to the driving member 110.

For causing the parts 118 and 119 to be collapsed within the periphery of the teeth upon driving member 110 there is provided a yoke 130 which is carried by bearing member 131, Fig. 18, which supports a bearing for shaft 132 of the driven member or disk 111. Yoke 130 has a pair of arms with fingers 133, 134, diametrically opposite the center of disk 111. The distance between the ends of the fingers 133 and 134 is such as to cause the fingers to engage the rollers 135 and 136 carried by the cam when the axes of the driving and driven members 110 and 111 are co-axial or when there is a one-to-one speed ratio between these two members. Rollers 135 and 136 are so mounted upon parts 119 and 118, respectively, of the cam as to cause the collapse of the cam against the action of spring 124 when the one-to-one speed ratio obtains. When the axes of the driving and driven members are displaced upon either side of such position, fingers 133 and 134 no longer engage the rollers and parts 118 and 119 of the cam are more distant from each other because of the influence of spring 124. This results in the disposition of the cam beyond the teeth of the driving member 110, as illustrated, for example, in positions A and C, Figs. 7 and 17.

In the diagram of Fig. 7, spring 117 continuously urges the free end 114 of the connecting element 112 toward the driving member 110. The free end of the connecting element is provided with a hook for engaging the teeth on the periphery of the driving member. In the mechanism illustrated in Figs. 1 to 6, inclusive, the counterpart of cam 151 is cam 51, and, as clearly seen in Figs. 2 and 3, cam 51 is so shaped as to permit the engagement of the uppermost dog 18, and the immediately preceding dog with the opposite surfaces 20, 21 of the grooves 19, whereas the other dogs are maintained out of contacting relation with the grooves and are held against the action of their respective springs 17.

This latter condition is accomplished when the fingers 52 carried on pins 16 come into contact with the high surface 53 of the cam (Fig. 3).

In the mechanism illustrated in Figs. 1 to 6, inclusive, due to a reason of structural simplifying the cam 51 has been indicated as invariable and immovable. It results that the connecting elements coming into motion-transmitting function between the driving and the driven member can never be in their total number—therefore the mechanism could not operate regularly in the rigorously co-axial position of the axes of the driving and driven members. It is in order to secure the possibility of a continuous operating also in the mediate position, as shown in Fig. 1, that it is necessary to keep the two axes slightly displaced in a direction perpendicular to the translating direction, as indicated by letters $d$ and $e$ in Fig. 1, so that such slight displacement may allow the succession of the engaging and non-engaging phases of the connecting elements with the driving member to take place, in virtue of the differences of traveling velocity of the adjacent portions, also in the mediate position as illustrated in Fig. 1.

Also in this latter case, however, despite the said displacement of the centers in the mediate position, it is obtained that the angular velocities of the driving and driven members are practically uniform and equal to each other.

A structural form of the invention, in which the principles just discussed with reference to Fig. 7 are embodied, is illustrated in Figs. 8 and 9. In this construction the driving shaft 60 carries two wheels 61, 62, having hooked teeth upon their peripheries. The connecting elements 63 are pivotally mounted upon a driven member 64 by means of pins 65. Springs 66 are provided for urging the connecting elements 63 toward the periphery of the driving member. The free end of each connecting element 63 is provided with a pin 68 adapted to engage the teeth 69. A roller 70, mounted upon each of the pins 68, serves to maintain the pins out of contact with the teeth 69 during the period of rotation of the driving member during which the connecting elements 63 are not functioning to transmit motion. The cam which accomplishes this function may be similar to that illustrated in Fig. 7, or otherwise designed according to the requirements of any particular mechanism as explained hereinbefore. The clicking effect which is incident to the overrunning of teeth by a hooked connecting element or pin is obviated in a design in which a locking dog is provided as a part of each connecting element, as, for example, in the modification illustrated in Figs. 11 and 12.

In Fig. 10 I have illustrated a detail of a modified form of the mechanism illustrated in Figs. 8 and 9. In this form, the driving member 73 is similar to that illustrated in Figs. 8 and 9, but the connecting elements 74 are so designed as to transmit motion to the driven member by compression through the connecting elements. This detail is intended to demonstrate the fact that the connecting elements may be so mounted and designed as to transmit force by compression as well as by tension.

Figure 11:
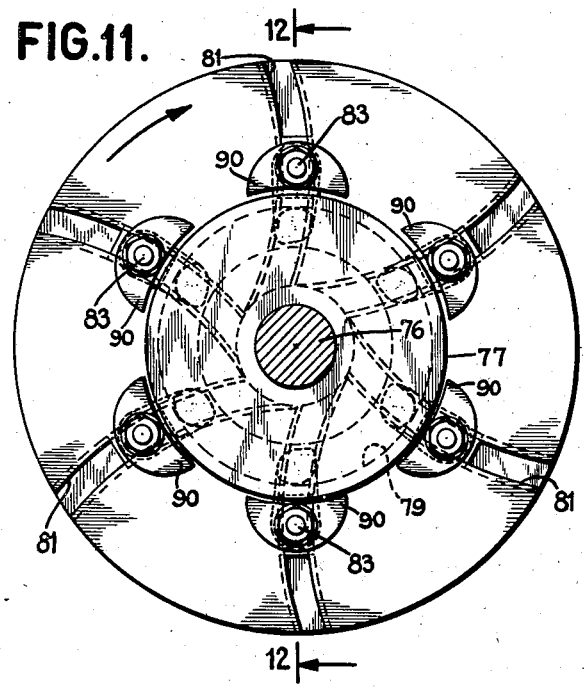
Fig. 11 is still another modification of the variable speed transmission mechanism.
Figure 12:
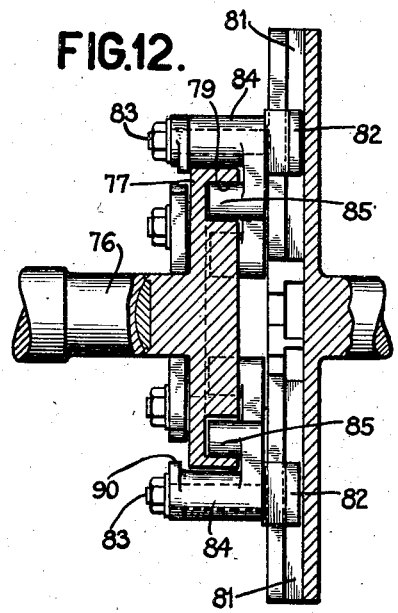
Fig. 12 is a section on line 12—12 of Fig. 11.

In Figs. 11 and 12 I have illustrated the principal parts of another form of mechanism. In this modification, the driving member 76 carries a disk 77 having a groove 79 similar to grooves 19 in the embodiment illustrated in Figs. 1 to 6, inclusive. The driven member consists of a disk having arcuate T-shaped slots having centers of curvature corresponding with the axes of pivot of the connecting elements 12 (Figs. 1, 2 and 3). Accordingly, the slots 81 will guide T-blocks 82 in paths corresponding to the paths of travel of the free ends of the connecting elements 12. Each of the blocks 82 carries a pin 83 upon which is mounted a rocker 84 from which a dog 85 extends into the circular groove 79 in the driving member. Each dog 85 has an oval or elliptical shape permitting it to slide freely between opposite walls of the groove 79 when the rocker 84 is moved to its extreme clockwise position about its pin 83, and which causes it to lock against the opposite surfaces of the circular groove 79 when the rocker 84 is rocked in a counterclockwise direction about its pivot 83. The action of the dogs 85 is similar to the action of the dogs 18 (Figs. 1, 2 and 3). When a particular dog reaches the end of a path of travel during which it is locked to the walls of the groove, it will be automatically unlocked because of the varying velocity, as already explained, and its rocking in a clockwise direction about pin 83 will be assured by a cam (such as shown at 51 in Figs. 1, 2 and 3) which engages finger 90. This finger is carried by rocker 84.

Figure 13:
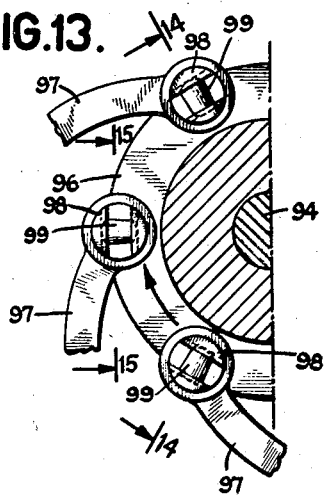
Fig. 13 is still another modification of the variable speed mechanism.
Figure 14:
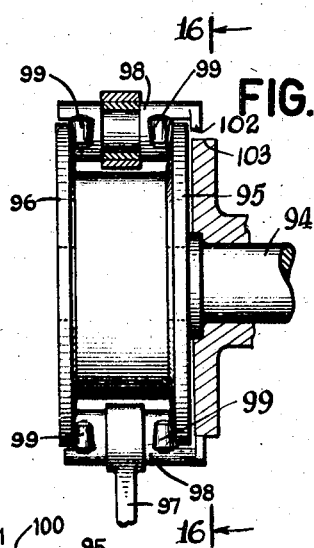
Fig. 14 is a section on line 14—14 of Fig. 13.
Figure 15:
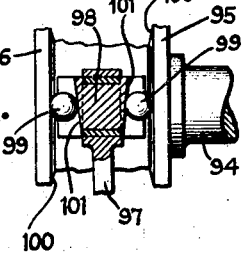
Fig. 15 is a section of a detail taken on line 15—15 of Fig. 13.

In Figs. 13, 14 and 15, I have shown still another modification, wherein the driving member 94 is provided with two slightly conical faced disks 95, 96, and the driven member has connecting elements 97 which carry at their free ends pivots or rockers 98. Each rocker 98 carries a pair of rollers 99 through which connection may be had between the disks 95, 96 and the rocker 98. This construction is in the form of an overrunning clutch, and each roller is so mounted as to be capable of being wedged between the non-parallel surfaces 100, 101 upon rocker 98, Fig. 15. Each rocker is provided with a lug 102, by which the radial position of the rocker about its axis may be controlled. This lug is adapted to be operated by a cam 103 which causes a rising of the rocker and consequently unlocking of the rocker from the disks 95 and 96 by the wedging of the rolls between the non-parallel surfaces 100, 101. By virtue of the sloping relation of surfaces 100, 101, the rockers will automatically free themselves from locking relation with the disks 95 and 96, as the rockers, at the moment when they come out of engagement, as said before, derive a velocity through the driven member which is greater than the velocity of the driving member at the points of contact between the rolls 99 and the engaging surfaces 100. The locking of the rockers 98 to the surfaces 95 and 96 by means of the rolls 99 is caused by the action of springs disposed similarly to the springs 117 indicated in Fig. 7, acting upon the connecting elements 97.

The different forms of the invention illustrated in Figs. 7 to 15, inclusive, are for the purpose of showing different modes of applying the principle of my invention, and no attempt has been made to illustrate complete details of the various elements. The different examples have been given for the purpose of illustrating different modes of applying the principle of the invention which is more carefully explained in reference to the construction illustrated in Figs. 1 to 6, inclusive, and by the schematic showing in Fig. 7.

What is claimed is:

1. In combination, a variable speed transmission mechanism, comprising a pair of members including a driving member and a driven member mounted for rotation and translation in respect to each other, means for guiding one of said members in translation in respect to the other said member in a line to one side of the center of rotation of said other member and extending to opposite sides of their positions for one-to-one ratio of transmission, and means including connecting elements for connecting said two members together so as to cause continuous motion transmission in all the relative positions of the axes of rotation of the members, the guiding by said guiding means of one of said members in a line to one side of the center of rotation of the other of said members resulting in enabling variation in the ratio of transmission through a one-to-one ratio from a high speed to a reduction speed, depending upon the relative positions of the axes of rotation of the driving and driven members, without interrupting the continuity of motion transmission.

2. In combination, a variable speed transmission mechanism, comprising a driving member and a driven member mounted for rotation and translation in respect to each other, means for supporting said members in different relative positions including positions of the axes of rotation of the two members on opposite sides of their positions of one-to-one ratio of transmission and displaced from one another normal to their axes for a one-to-one ratio of transmission, means including connecting elements for connecting said two members together so as to cause continuous motion transmission in all the relative positions of the axes of rotation of the members, and means for controlling the arc through which said connecting elements automatically come into effect for producing a driving connection between the driving member and the driven member in different relative positions of said members.

3. In combination, a speed transmission mechanism for use between a driving shaft and a driven shaft having a variable eccentricity relative to one another, driving and driven members mounted respectively on said shafts and having force transmitting elements carried by said members and entering into and coming out of engagement for causing connection and disconnection between said members, depending on whether or not said elements are overrunning, variable cam means for guiding said elements when overrunning, and means for collapsing said cam means for allowing contemporaneous engagement of all of the force transmitting elements when the driving and driven members are substantially coaxial.

4. In combination, a speed transmission mechanism for use between a driving shaft and a driven shaft having a variable eccentricity relative to one another, said shafts also being eccentric to each other in a direction normal to the direction of said variable eccentricity, driving and driven members mounted respectively on said shafts and having force transmitting elements carried by said members and entering into and coming out of engagement for causing connection and disconnection between said members, depending on whether or not said elements are overrunning, and cam means for guiding such of said force transmitting elements which are overrunning and not serving to connect together the driving and driven members.

ALVARO VINCENZONI.